(12) United States Patent
Anstey et al.

(10) Patent No.: US 10,932,416 B2
(45) Date of Patent: Mar. 2, 2021

(54) COMPOSITE WRAP MATERIAL WITH OVERLAPPING SEGMENTS

(71) Applicant: DEERE & COMPANY, Moline, IL (US)

(72) Inventors: Henry D. Anstey, Ottumwa, IA (US); Timothy J. Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 1129 days.

(21) Appl. No.: 14/547,444

(22) Filed: Nov. 19, 2014

(65) Prior Publication Data
US 2016/0137372 A1    May 19, 2016

(51) Int. Cl.
*A01F 15/07*     (2006.01)

(52) U.S. Cl.
CPC .. *A01F 15/0715* (2013.01); *A01F 2015/0745* (2013.01)

(58) Field of Classification Search
CPC ......... A01F 15/0715; A01F 2015/0745; B32B 7/04; D10B 2401/22
USPC ........ 442/38–41, 131, 278, 286–294; 53/170
See application file for complete search history.

(56) References Cited

U.S. PATENT DOCUMENTS

| 4,703,605 A | 11/1987 | Ackermann et al. |
| 4,910,032 A * | 3/1990 | Antoon, Jr. ............ A23L 3/3418 206/213.1 |
| 6,342,285 B1 * | 1/2002 | Shepard ............ A44B 18/0011 428/88 |
| 6,984,431 B2 | 1/2006 | Mass et al. |
| 7,093,406 B2 | 8/2006 | Anstey et al. |
| 7,625,332 B2 | 12/2009 | Mass et al. |
| 7,636,987 B2 | 12/2009 | Derscheid et al. |

(Continued)

FOREIGN PATENT DOCUMENTS

| EP | 0233471 A1 | 8/1987 |
| NZ | 554089 A | 12/2009 |
| WO | 2007063351 A2 | 6/2007 |

OTHER PUBLICATIONS

Paillat, J.M. and F. Gaillard, Air-Tightness of Wrapped Bales and Resistance of Polyethylene Stretch Film under Tropical and Temperate Conditions, Journal of Agricultural Engineering Research, vol. 79, Issue 1, May 2001, p. 15-22.*

(Continued)

*Primary Examiner* — Jennifer A Gillett
(74) *Attorney, Agent, or Firm* — Klintworth & Rozenblat IP LLP

(57) ABSTRACT

A composite wrap material for wrapping a bale may include a segment of net wrap, a first barrier segment of semi-permeable material disposed to overlap with the segment of net wrap, and a second barrier segment of material disposed to overlap, at least in part, with the first barrier segment of semi-permeable material and the segment of net wrap. The segment of net wrap may be longer than an outer perimeter length of the bale and may be at least as wide as a width of the bale. When the bale is wrapped by the composite wrap material, the overlap of the second barrier segment of material with the first barrier segment of semi-permeable material may form first and second barrier layers to impede movement of liquid water from outside the composite wrap material to the outer perimeter of the bale.

16 Claims, 5 Drawing Sheets

(56) References Cited

U.S. PATENT DOCUMENTS

| | | |
|---|---|---|
| 7,954,633 B2 | 6/2011 | Anstey et al. |
| 2006/0005512 A1* | 1/2006 | Anstey ................ A01F 15/0715 53/399 |
| 2008/0134645 A1* | 6/2008 | Mass ................... A01F 15/0715 53/462 |
| 2010/0088859 A1* | 4/2010 | Derscheid ............... A01F 25/14 24/16 R |
| 2012/0295070 A1* | 11/2012 | Eggers ................... A01F 25/13 428/172 |
| 2013/0032046 A1* | 2/2013 | Ohrn .................. A01F 15/0715 100/40 |

OTHER PUBLICATIONS

John Deere B-Wrap™ Brochure, Admitted Prior Art.
European Patent Office, Extended European Search Report in Application No. 15195461.7 dated Apr. 11, 2016.

\* cited by examiner

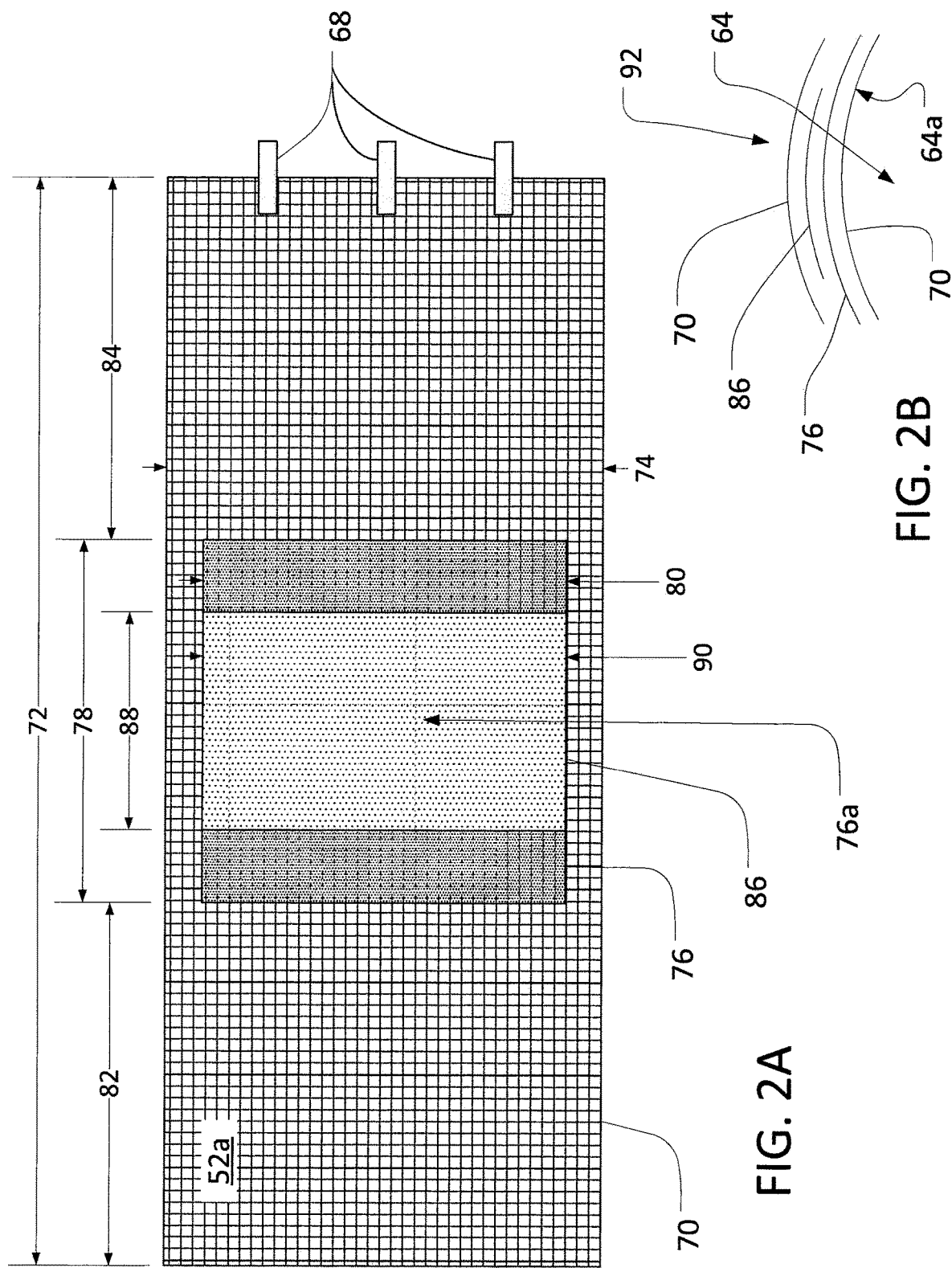

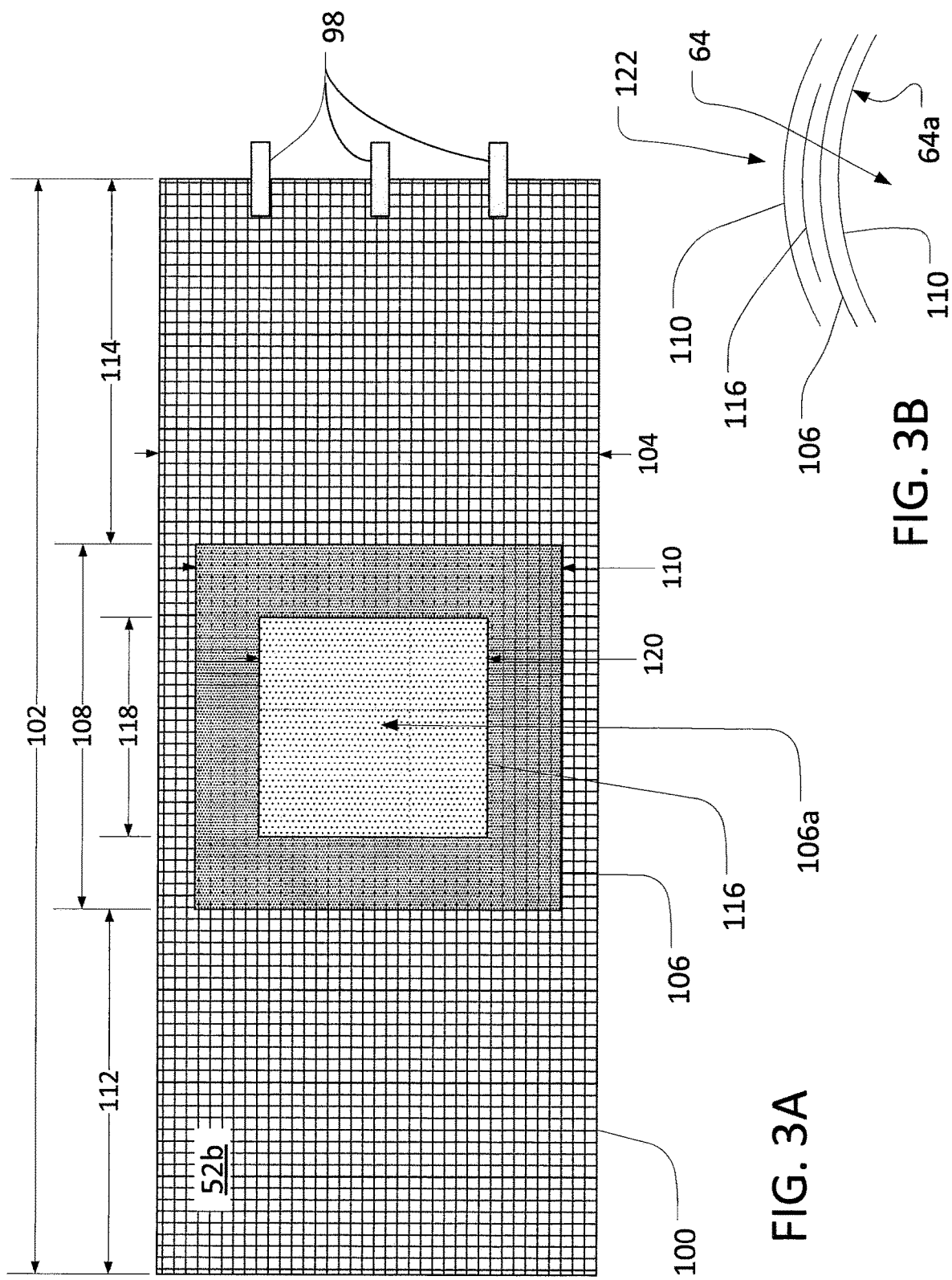

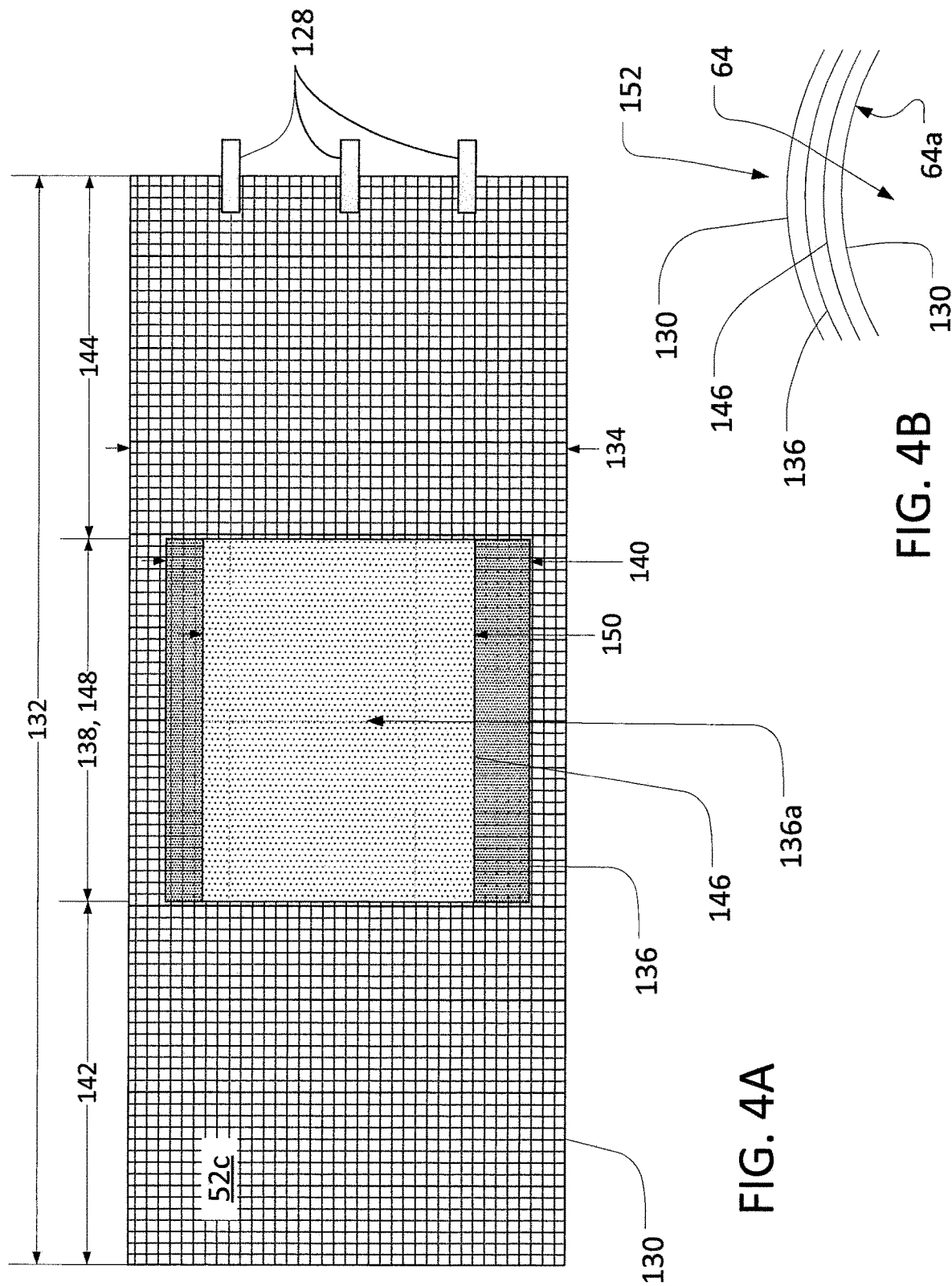

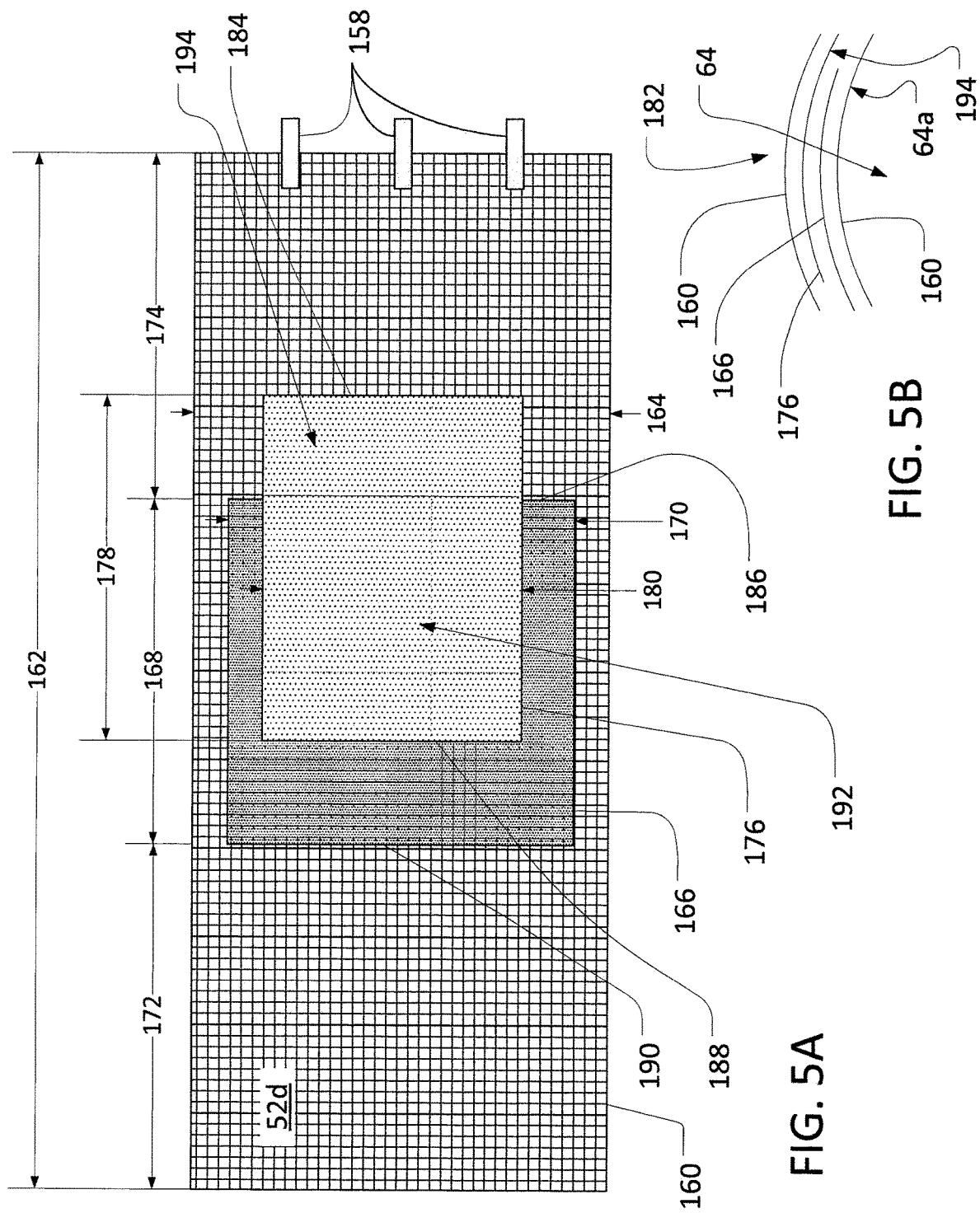

COMPOSITE WRAP MATERIAL WITH OVERLAPPING SEGMENTS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to wrap material, including wrap material for agricultural bales.

BACKGROUND OF THE DISCLOSURE

One approach to storing agricultural material (e.g., hay, forage crops, silage, and so on) is to package the material in large cylindrical (or other) bales. Such bales may exhibit some degree of natural tendency to shed rainfall and other elements. However, water and other substances may still penetrate bales, particularly the outer layers of the bales. For example, water from rainfall may seep downwards into upward-facing portions of various bales, and moisture from the ground may wick upwards into downward-facing portions of the bales. This may lead to the loss of various amounts of the crop material in the bales due to spoilage, mold, and other detrimental effects.

Moisture from within a bale may also increase the risk of lost crop material. For example, if internal moisture is prevented from escaping from a bale, it may condense near the outer perimeter of the bale. This may result in the outer layers of the bale remaining damp for extended periods of time, which may in turn result in spoilage of these outer layers.

The various sources of moisture noted above create a tension between protecting a bale from external moisture, and allowing internal moisture to escape from the bale without significant condensation on (or in) the bale. Known wrap materials may provide relatively good performance with regard to one of certain moisture sources, but relatively poor performance with regard to others. For example, non-porous plastic sheeting may prevent rain or surface water from infiltrating a bale wrapped in the sheeting, but may not permit water vapor within the bale to escape before it condenses and wets the outer layers of the bale. Similarly, material such as net wrap may readily permit water vapor to escape from a bale, but may not prevent the infiltration of liquid water from external sources. Even semi-permeable membranes, designed to selectively permit the passage of vapor but not liquid, may permit some amount of external liquids to infiltrate the bale.

SUMMARY OF THE DISCLOSURE

A composite wrap material is disclosed for wrapping bales of agricultural material.

According to one aspect of the disclosure, a composite wrap material for wrapping a bale may include a segment of net wrap, a first barrier segment of semi-permeable material disposed to overlap with the segment of net wrap, and a second barrier segment of material disposed to overlap with the first barrier segment of semi-permeable material and the segment of net wrap. The segment of net wrap may be longer than an outer perimeter length of the bale and may be at least as wide as a width of the bale. When the bale is wrapped by the composite wrap material, the overlap of the second barrier segment of material with the first barrier segment of semi-permeable material may form first and second barrier layers to impede movement of liquid water from outside the composite wrap material to the outer perimeter of the bale.

In certain embodiments, the second barrier segment of material may be configured to be at least one of substantially permeable to water vapor and substantially impermeable to liquid water. The second barrier segment and the first barrier segment of semi-permeable material may be formed from a single type of semi-permeable material.

In certain embodiments, the segment of net wrap may be at least two or three times as long as the outer perimeter length of the bale. The first barrier segment of semi-permeable material may be at least as long as the outer perimeter length of the bale. The second barrier segment may have a shorter length than the first barrier segment of semi-permeable material. The second barrier segment of material may overlap with a central region of the first barrier segment of semi-permeable material. The second barrier segment may have a smaller width than the first barrier segment of semi-permeable material.

In certain embodiments, when the composite wrap material is wrapped around the bale, the composite wrap material may form a sleeve of successive layers around the bale. The layers may include, moving from the outer perimeter of the bale to outside of the sleeve, a binding layer of at least part of the segment of net wrap, the first barrier layer, and the second barrier layer. The first barrier layer may be formed from the first barrier segment of semi-permeable material or the second barrier segment, and the second barrier layer may be formed from the other of the first barrier segment of semi-permeable material and the second barrier segment of material.

The details of one or more implementations of the disclosure are set forth in the accompanying drawings and the description below. Other features and advantages will become apparent from the description, the drawings, and the claims.

BRIEF DESCRIPTION OF THE DRAWINGS

FIG. 2A is a schematic view of a length of an embodiment of the composite wrap material of FIG. 1;

FIG. 2B is a schematic view of a portion of the composite wrap material of FIG. 2A, when wrapped around a bale, taken from an axial end of the bale;

FIG. 3A is a schematic view of a length of another embodiment of the composite wrap material of FIG. 1;

FIG. 3B is a schematic view of a portion of the composite wrap material of FIG. 3A, when wrapped around a bale, taken from an axial end of the bale;

FIG. 4A is a schematic view of a length of still another embodiment of the composite wrap material of FIG. 1;

FIG. 4B is a schematic view of a portion of the composite wrap material of FIG. 4A, when wrapped around a bale, taken from an axial end of the bale;

FIG. 5A is a schematic view of a length of yet another embodiment of the composite wrap material of FIG. 1; and FIG. 5B is a schematic view of a portion of the composite wrap material of FIG. 5A, when wrapped around a bale, taken from an axial end of the bale.

Like reference numerals in the drawings indicate like components, parts, or operations.

DETAILED DESCRIPTION

Figure 1:
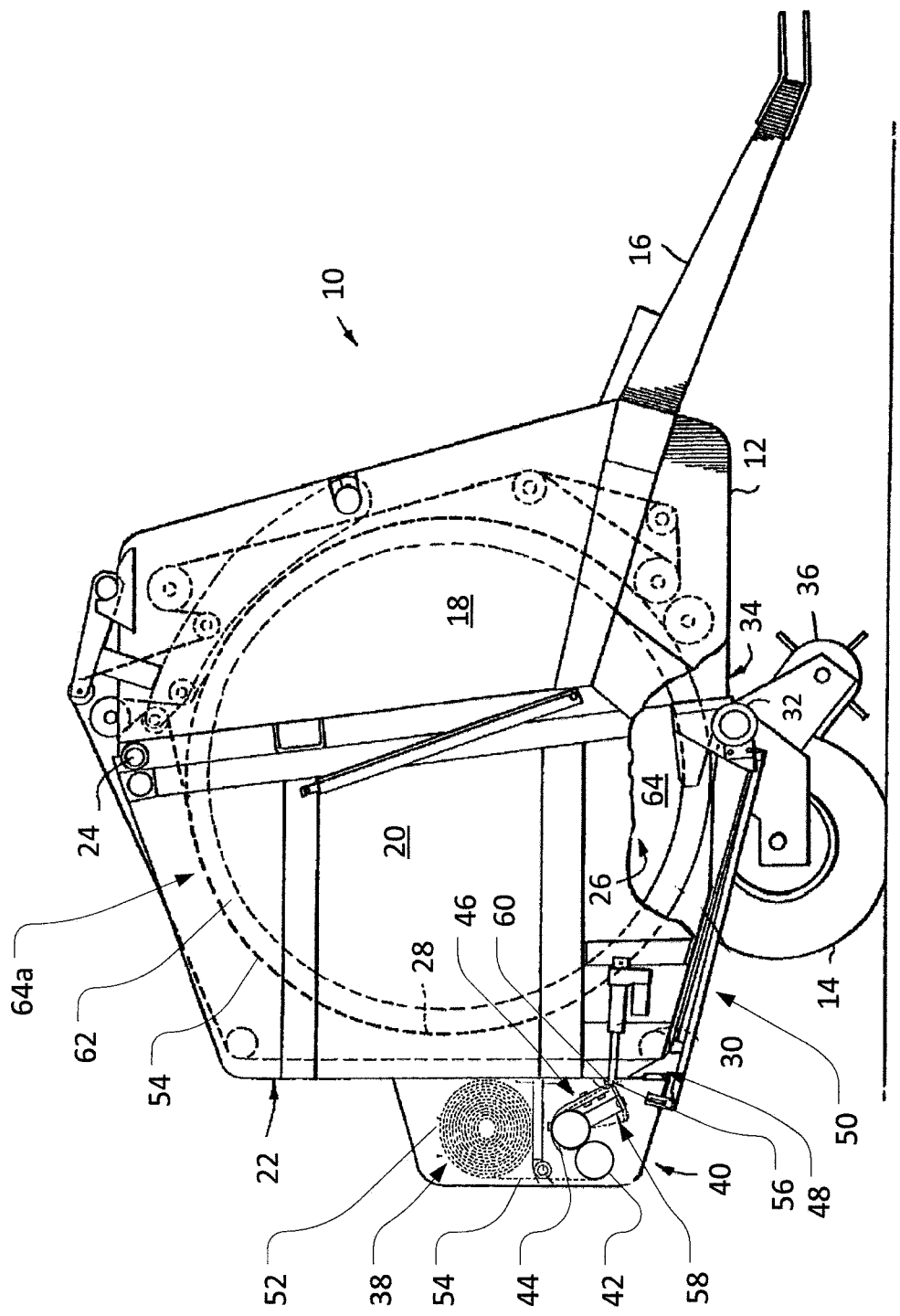
FIG. 1 is a simplified side view of an example baler for creating a round bale and wrapping the bale with composite wrap material from a roll.

The following describes one or more example implementations of the disclosed composite wrap material, as shown in the accompanying figures of the drawings described briefly above.

As used herein, the "length" of a segment of wrap material may refer to the dimension of the wrap material in the direction of wrapping. For example, for a segment of wrap material that is rolled around a circumference of a round bale, the "length" of the segment may refer to the dimension of the segment that extends along the circumference of the bale. In contrast, the "width" of a segment of wrap material may refer to the dimension of the wrap material that is transverse to the direction of wrapping (or to the segment length). For example, for a segment of wrap material that is rolled around a circumference of a round bale, the "width" of the segment may refer to the dimension of the segment that extends axially along the outer surface of the bale (i.e., transverse to the circumference of the bale).

Also as used herein, two bodies of material may be viewed as "overlapping" if one of the bodies overlays the other body, at least in part. For example, where a sheet of composite wrap material is provided, one material of the sheet may overlap with another material of the sheet if the one material is overlaid over the other material during use of the sheet.

As also discussed above, management of moisture may be important to reducing the spoilage and other losses of crop material that has been formed into bales. Moisture may accumulate on the crop material of wrapped bales in various ways. For example, liquid water may pass through the wrap material wrapping the bales from the outside environment and thereby wet the crop material of the bales. Also, water vapor (e.g., from the crop material itself) may condense on the interior of the wrap material and thereby also wet the crop material. Accordingly, part of successful moisture management for wrapped bales may include impeding passage of liquids from the exterior environment to the wrapped bales while also permitting passage of vapor from the bales to the exterior environment. Other protection may also be useful, including protection from ultraviolet ("UV") light or other environmental effects. Among other benefits, the composite wrap material disclosed herein may provide this functionality and protection.

In various embodiment, a composite wrap material (herein, "CWM") may be formed from a number of overlapping segments. When the CWM is wrapped around a bale, the overlap of the segments may result in a series of distinct layers including various barrier layers (i.e., layers of material forming a barrier to passage of various substances), which may collectively impede movement of liquid water from outside the wrap material to the bale and penetration of UV radiation. In certain embodiments, the barrier layers may also permit passage of water vapor, such that condensation on the inner surface of the wrap material (i.e., at the interface with the bale) is reduced or avoided.

A first segment of the CWM may be formed from net wrap, which may include a multitude of openings (e.g., as a mesh) that are permeable to both liquid and vapor. The net wrap segment may extend over a length that is equal to or greater than the length of the perimeter of a bale to be wrapped, such that the net wrap segment may surround the perimeter of the bale after the bale is wrapped. In this way, for example, the net wrap segment may serve to hold the crop material of bale in place, while readily permitting passage of moisture in various forms.

The width of the net wrap segment may be of a similar scale to a width of the wrapped bale. In certain embodiments, the width of the net wrap segment may exceed the width of the bale. In a round (i.e., cylindrical) bale, for example, this may result in the net wrap covering the cylindrical perimeter of the bale and also extending radially inward by various degrees along the axial ends of the bale.

A second segment of the CWM may be formed from a semi-permeable or breathable material configured to be substantially permeable to water vapor. In certain embodiments, the semi-permeable material may also be configured to be substantially impermeable to liquid water, although the semi-permeable material may generally not present an entirely impenetrable barrier to water vapor. The semi-permeable segment may be configured to overlap with at least part of the segment of net wrap. In this way, for example, the semi-permeable segment of the CWM may generally protect the bale (or portions thereof) against excessive internal condensation, by allowing water vapor from the wrapped bale to escape to the ambient environment.

In certain embodiments, the semi-permeable segment may be configured with a somewhat smaller length than the net wrap segment. In certain embodiments, for example, the semi-permeable segment may be somewhat smaller in length than the perimeter of a bale to be wrapped, such that the semi-permeable segment does not cover the entire perimeter of the bale. In other embodiments, the net wrap segment, when wrapped around a bale, may extend around the perimeter of the bale multiple times. In contrast, for example, the semi-permeable segment may extend around the perimeter of the bale only once (or less).

The CWM may also include a third segment, which may overlap with both of the first and second segments noted above. In certain embodiments, the third segment may be formed of semi-permeable material of a similar (or identical) nature to the material of the semi-permeable segment. In this way, for example, the third segment may also present a barrier to the passage of liquid water while permitting the passage of water vapor. In certain embodiments, the third segment may be formed from other material, such as material that is entirely impermeable to both water vapor and liquid water.

As noted above, the third segment of the CWM may overlap with at least a portion of the net wrap segment and the semi-permeable segment. In this way, for example, when a bale is wrapped by the CWM, the overlap of at least the second (i.e., semi-permeable), and third segments of the CWM may present a series of layers, including multiple successive barrier layers providing increased protection for the bale from the infiltration of liquid water from the ambient environment. As also noted above, the barrier layers may further provide protection against UV radiation. For example, an outer barrier layer may protect an inner barrier layer from degradation that may occur were the inner barrier layer directly exposed to ambient light.

In certain embodiments, the third segment may be configured with somewhat smaller dimensions than the net wrap segment and the semi-permeable segment. For example, the third segment may exhibit a length or width that is somewhat less than the length of width of the semi-permeable segment.

In this way, for example, when the CWM is wrapped around a bale, the third segment and the semi-permeable segment may provide multiple barrier layers over a portion of the perimeter of the bale, but not over the entire perimeter of the bale. This may be useful, for example, in order to provide enhanced protection against environmental factors (e.g., liquid water, UV light, and so on) over a portion of the bale perimeter (i.e., over the area of the multiple barrier layers), while providing reduced resistance to the passage of water vapor at other locations. Where the third segment is configured to be located along an upper surface of a bale when the bale is resting in a field, this may for example, result in increased protection against rain, without excessively reducing the ability of water vapor to escape from the bale to the ambient environment.

Although various examples herein may discuss the use of the disclosed CWM with respect to a round bale (and round baling operations), it will be understood that the CWM also may be beneficially used with other bale configurations (and other baling operations). Further, although various example materials are presented below, it will be understood that the various segments of the disclosed CWM may be formed from a variety of materials known in the art.

Referring now to FIG. 1, an example round baler 10 is depicted, which may be utilized to apply various embodiments of the CWM disclosed herein. It will be understood that other configurations of a baler may be possible, including for the formation of square or other bales. The baler 10 includes a main frame 12 supported on a pair of ground wheels 14. A tongue 16 is fixed to, and projects forwardly from, the frame 12. A tractor or other work vehicle (not shown) may be coupled to the front end of the tongue 16 for towing the baler 10 along windrows of crop material. A crop pick-up unit 36, carried by the main frame 12, may then gather material from the windrows and convey crop into the inlet 34 to an expansible baling chamber 26, so that the material may be formed into bales. As depicted, a round bale 64 has been formed (or is being formed) within the baler 10.

The frame 12 includes a pair of transversely spaced sidewalls 18 terminating in respective upright rear edges. Mating with the upright edges of the sidewalls 18 are respective upright front edges of a pair of transversely spaced sidewalls 20 forming part of a bale discharge gate 22. The gate 22 includes an upper forward region that is mounted, by a pivot assembly 24, to an upper rear location of the sidewalls 18 in order to establish a horizontal transverse axis about which the discharge gate 22 is pivoted between a lowered working position, as shown, and a raised discharge position (not shown), for permitting the bale 64 to drop onto the ground.

A plurality of bale-forming belts 28 cooperate with the fixed sidewalls 18 and the discharge gate sidewalls 20, so as to define the baling chamber 26. As depicted, the bale-forming belts 28 disposed in a side-by-side arrangement across the width of a plurality of belt support rolls (e.g., a lower rear gate roll 30, and a lower front gate roll 32), some of which extend between the fixed sidewalls 18 and some of which extend between the discharge gate sidewalls 20. The belts 28, where they engage the lower front gate roll 32, define the rear side of the baling chamber crop inlet 34.

A bale wrapping device 40 is mounted to the rear and underside of the bale discharge gate 22. It can be seen that the wrapping device 40 includes lower and upper feed rolls 42 and 44, respectively, with the upper feed roll 44 being located forwardly of the feed roll 42. A wrap material directing arrangement 46 is provided for directing the wrap material toward a nip 48, defined between the belts 28, where the belts 28 engage a lower rear region of the lower rear gate roll 30, and a wrap material guide assembly 50 positioned. The guide assembly 50 extends fore-and-aft between the lower rear gate roll 30 and the lower front gate roll 32, and is generally disposed beneath a lower side of the rune of the belts 28, with an upper guide surface in contact with the belts 28.

A roll 38 of the CWM 52 is supported at a location above the feed rolls 42 and 44. A length 54 of the CWM 52 extends downwardly from a rear side of the roll 38, around a lower region of the rear feed roll 42, through the nip of the feed rolls 42 and 44, around an upper region of the feed roll 44, and down through the directing arrangement 46. Adjacent the lower end of the material directing arrangement 46, a shear bar 56, preferably constructed of a relatively hard synthetic plastic or rubber material, is mounted such that it extends transversely across the rear of the discharge gate 22. A knife assembly 58 is mounted for pivoting about the rotational axis of the upper feed roll 44. A knife edge 60 of the assembly 58 is disposed parallel to the shear bar 56. In order to sever the length 54 of the CWM 52 from the roll 38, the knife assembly 58 may be pivoted from its standby position (shown in dotted relief) to its cutting position (shown in solid relief) in order to press the length of wrap material 54 against the shear bar 56. Typically, this cutting operation may be executed at (or near) the end of the wrapping cycle or process, such that the bale 64, wrapped with the length 54 of the CWM 52, may be ejected from the baling chamber 26. As depicted, for example, the length 54 of the CWM 52 has been wrapped around the bale 64, surrounding the cylindrical perimeter 64a of the bale 64 and, due to the width of the CWM 52, extending radially over a part 62 of the axial ends of the bale 64.

As noted above, the CWM 52 may be configured with multiple overlapping segments of material such that, when the bale 64 is wrapped by the CWM 52 (e.g., by the length 54 from the roll 38), portions of the bale 64 may be covered with multiple barrier layers. Referring also to FIG. 2A, various example overlapping segments of an example CWM 52a are depicted. The CWM 52a of FIG. 2A may be utilized in various ways, and with various baling devices (e.g., the baler 10). In certain embodiments, multiple instances of the length of the CWM 52a depicted in FIG. 2A may be connected end to end (e.g., integrally formed as a continuous, extended length of the CWM 52a) such that a roll of the CWM 52a (e.g., the roll 38 of FIG. 1) may be formed.

As depicted in FIG. 2A, a first segment 70 of the length of the CWM 52a is formed from net wrap material. The segment 70 extends over a length 72 and a width 74, which may be configured to exhibit various dimensions, as appropriate for a particular baling operation. In certain embodiments, it may be useful to dimension the length 72 and width 74 of the segment 70 with respect to the expected dimensions of a bale to be wrapped by the CWM 52a. For example, where the baler 10 is expected to produce round bales with a characteristic circumference and width (i.e., as measured between axial ends of the formed bale, into the page in FIG. 1), it may be appropriate to dimension the length 72 and width 74 of the segment 70 with respect to the characteristic circumference and width. (It will be understood that, for other bale or baler configurations, other dimensions may be utilized for the width 74 and the length 72. For a non-cylindrical bale, for example, the length 72 may be dimensioned with respect to the length of an outer perimeter of the non-cylindrical bale, which is to be wrapped with the CWM 52a.)

As depicted, the length 72 extends over approximately three circumferences of the bale 64, and the width 74 extends somewhat longer than the width of the bale 64 (i.e., as measured into the page in the depiction of FIG. 1). In this way, for example, when the bale 64 is wrapped with the CWM 52a, the length 72 of the segment 70 may extend approximately three revolutions around the bale 64. Further, due to the width 74, the segment 70 may extend radially over the side part 62 of the bale 64 (see FIG. 1). It will be understood, however, that other dimensions for the length 72 and the width 74 may be possible, such as a length 72 of two or fewer circumferences of the bale 64 or a width 74 approximately equal to the width of the bale 64.

Also as depicted in FIG. 2A, a second segment 76 of the length of the CWM 52a may be formed from semi-permeable material and may be attached to the net wrap segment 70 (directly or indirectly) in various ways. In various embodiments, the semi-permeable segment 76 may be configured to overlap with the net wrap segment 70 to various degrees, examples of which are described in greater detail below.

Generally, semi-permeable materials may include materials that are configured to be substantially impermeable to liquids (e.g., liquid water), while also being generally permeable to vapor (e.g., water vapor). For example, a semi-permeable material may be a material that sheds a majority portion of incident liquid, rather than permit passage of the liquid through the material, while permitting passage through the material of a substantial portion of incident vapor. Such a material may be useful for moisture management in baling, as the material may permit water vapor to escape from the baled crop material to the ambient environment, while also impeding the movement of liquid water from the environment into the bale. Semi-permeable materials may include materials such as thin films of certain plastics, micro-perforated plastic films, Tyvek®, Gore-Tex®, and various other woven or bonded fiber materials. (Tyvek® is a registered trademark of E. I. du Pont de Nemours and Company or its affiliates in the United States, foreign jurisdictions, or both. Gore-Tex® is a registered trademark of W. L. Gore and Associates or its affiliates in the United States, foreign jurisdictions, or both.)

Generally the semi-permeable segment 76 extends over a length 78 and a width 80, which may relate to the length 72 and width 74 of the net wrap segment 70 in various ways. As depicted, the length 78 of the semi-permeable segment 76 is generally smaller than the length 72 of the net wrap segment 70, and the width 80 of the semi-permeable segment 76 is generally smaller than the width 74 of the net wrap segment 70. For example, whereas the width 74 of the net wrap segment 70 may be larger than the characteristic width of a relevant bale (e.g., the bale 64), the width 80 of the semi-permeable segment 76 may be generally equal to (or less than) the width of the bale. In this way, for example, with the semi-permeable segment 76 centrally located with respect to the width 74 of the net wrap segment 70, the semi-permeable segment 76 may generally cover the entire width of the bale 64, without extending (or extending very far) along the side part 62 of the bale 64.

Whereas the depicted length 72 of the net wrap segment 70 may extend over multiple circumferences (or other outer perimeter lengths) of the bale 64, in certain embodiments, the length 78 of the semi-permeable segment 76 may only extend over one circumference (or less) of the bale 64. As depicted, for example, a distance 82 from a first end of the net wrap segment 70 to a first end of the semi-permeable segment 76 may be approximately equal to one circumference of the bale 64. The length 78 of the semi-permeable segment 76, as well as a length 84 from a second end of the semi-permeable segment 76 to a second end of the net wrap segment 70, may also be approximately equal to one circumference of the bale 64. In this way, as the bale is wrapped by the length of the CWM 52a depicted in FIG. 2A, a full circumference of the bale 64 may be wrapped with the length 82 of the net wrap segment 70. This may generally provide a binding layer, to hold the crop material in place in the formed bale. Another full circumference of the bale 64 may then be wrapped with the length 78 of the semi-permeable segment 76, with the semi-permeable segment 76 overlapping with the length 82 of the net wrap segment 70. Finally, still another full circumference of the bale 64 may be wrapped with the length 84 of the net wrap segment 70, with the length 84 of the net wrap segment 70 overlapping with the length 78 of the semi-permeable segment 76. In this way, a sleeve of the CWM 52a with multiple overlapping layers, including multiple barrier layers, may be formed around the bale 64. Various fasteners (e.g., fasteners 68) may then be utilized to secure the sleeve in place.

Still referring to FIG. 2A, still another segment 86 may be included in the depicted length of the CWM 52a. The segment 86 may exhibit a length 88 and a width 90, and may be generally configured to overlap with the semi-permeable segment 76 as well as the net wrap segment 70. As also described above, this may provide a region on the CWM 52a in which the combined barrier layers of the segment 86 and the semi-permeable segment 76 offer greater resistance to the passage of liquids than the semi-permeable segment 76 alone. This may be useful, for example, in order to provide enhanced protection against rain or standing water over part, but not all, of a wrapped bale. The segment 86 may also (or alternatively) serve other functions, such as to protect at least part of the semi-permeable segment 76 (or the bale 64 and wrapping thereof, generally) from UV rays, or other environmental effects. The segment 86 may be attached (directly or indirectly) to the semi-permeable segment or to the net wrap segment 70 in various ways.

In certain embodiments, the segment 86 may be formed from a semi-permeable material that is the same as (or similar to) the material forming the semi-permeable segment 76. For example, where the semi-permeable segment 76 is formed from micro-perforated plastic film, the perforations in the film may tend to permit the passage of some amount of liquid water, as well as water vapor. With the segment 86 also formed of micro-perforated plastic film, the double (or other multiple) barrier layers of the overlapping segments 76 and 86 may usefully reduce the amount of liquid water that passes from the ambient environment to a wrapped bale, while still permitting some amount of water vapor to escape from the bale.

In certain embodiments, the segment 86 may be formed from a different material. For example, in contrast to the semi-permeable segment 76, the segment 86 may be formed from impermeable material, such as non-perforated plastic sheeting that is impermeable to liquid and vapor. In this way, for example, where the segments 76 and 86 overlap, the resulting double (or other multiple) barrier layers may substantially prevent passage of liquid water into the bale, while still potentially allowing some water vapor to escape (e.g., around the edges of the segment 86). Alternatively (or additionally) various other materials may be utilized for the segment 86.

Although alternative configurations may be possible, in the embodiments depicted, one or both of the length 88 and width 90 of the segment 86 may be somewhat smaller in dimension than the length 78 and width 80 of the semi-permeable segment 76. As depicted in FIG. 2A, for example, the width 90 of the segment 86 extends over approximately the same distance as the width 80 of the semi-permeable segment (e.g., over the width of the bale 64), whereas the length 88 of the segment 86 extends only a fraction of the length 78 of the semi-permeable segment 76. Also as depicted, the segment 86 is centrally disposed on the semi-permeable segment 76 (and the net wrap segment 70) so as to overlap with a central region 76a of the semi-permeable segment 106. As depicted, this results in the non-overlapping portions of the semi-permeable segment 76 (with respect to the segment 86) being similarly sized and generally congruent with each other. Other configurations may also be possible.

Configuring the length 88 (or width 90) of the segment 86 to be somewhat smaller than the length 78 (or width 80) of the semi-permeable segment 76 may be useful in order for the multiple barrier layers provided by the overlapping segments 76 and 86 to extend over part, but not all, of the circumference (or width) of the bale 64. For example, in the embodiment depicted in FIG. 2A, when the bale 64 is wrapped with the CWM 52a, the net wrap segment 70 may wrap around the circumference of the bale 64 three times and the semi-permeable segment 76 may wrap around the circumference of the bale 64 one time. The segment 86, however, may wrap only part way around the circumference of the bale 64 (e.g., one-tenth of the circumference, or more), such that part of the bale 64 is wrapped by the semi-permeable segment 76 but not by the segment 86. In this way, for example, the portion of the bale 64 where the segments 76 and 86 overlap may exhibit relatively high impermeability with respect to liquids (or relatively high UV protection), whereas the portion of the bale 64 not wrapped by the segment 86 may exhibit relatively high permeability with respect to vapor.

In certain embodiments, the portion of the bale 64 where the segments 76 and 86 overlap may be positioned in order to maximize protection against liquids (or UV rays), while also allowing for appropriate vapor movement. For example, as depicted in the partial view of FIG. 2B, the bale 64 may be oriented in a field with the segment 86 generally near the top of the bale 64, such that the two barrier layers of the segment 86 and the semi-permeable segment 76 may provide enhanced liquid protection at the top of the bale 64.

Still referring to FIG. 2B, it can be seen, in the embodiment depicted, that the CWM 52a, when wrapped around the bale 64, forms a sleeve 92 of four successive layers. An inner binding layer to hold the crop material in place in the formed bale, formed by the length 82 of the net wrap segment 70, is immediately proximate the cylindrical perimeter 64a of the bale 64. A first barrier layer, formed by the semi-permeable segment 76, is disposed outside of the binding layer, with respect to the bale 64. A second barrier layer, formed by the segment 86, is disposed outside of the first barrier layer, with respect to the bale 64. Finally, a second binding layer, formed by the length 84 of the net wrap segment 70, is disposed outside of the second barrier layer, with respect to the bale 64. It will be understood that, depending on the configuration of the various segments 70, 76, and 86, these barrier layers (or others), may be disposed at various other locations on the bale 64, and may exhibit various other degrees of overlap (or non-overlap).

In other embodiments, other numbers or configurations of layers, including barrier layers, may be utilized. For example, where either of the segments 76 or 86 is wrapped additional times around the bale 64, an additional barrier layer (or layers) may be formed. Likewise, where a shorter length of the net wrap segment 70 is utilized, a second binding layer may not be formed by the net wrap segment 70, or may be formed only over part of the bale perimeter 64a. Further, the relative order of the layers may vary from that depicted in FIG. 2B. For example, in the embodiment depicted, the semi-permeable segment 76 is disposed between the segment 86 and the inner layer of the net wrap segment 70, such that the first barrier layer is formed by the semi-permeable segment 76 and the second barrier layer is formed by the segment 86. In other embodiments, the segment 86 may be disposed between the semi-permeable segment 76 and the inner layer of the net wrap segment 70, such that the first barrier layer is formed by the segment 86 and the second barrier layer is formed by the semi-permeable segment 76. In certain embodiments, additional barrier layers (e.g., three, four, or more barrier layers) may be formed. For example, three or more barrier layers may be formed from the segments 76 and 86, from other segments (not shown), or from a combination of one or more of the segments 76 and 86 and other segments (not shown).

Referring also to FIG. 3A, various example overlapping segments of a length of another example CWM 52b are depicted. The CWM 52b of FIG. 3A may be utilized in various ways, and with various baling devices (e.g., the baler 10). In certain embodiments, multiple instances of the length of the CWM 52b depicted in FIG. 3A may be connected end to end (e.g., integrally formed as a continuous, extended length of the CWM 52b) such that a roll of the CWM 52b (e.g., the roll 38 of FIG. 1) may be formed.

As depicted in FIG. 3A, a first segment 100 of the length of the CWM 52b is formed from net wrap material. The segment 100 extends over a length 102 and a width 104, which may be configured to exhibit various dimensions, as appropriate for a particular baling operation. In certain embodiments, it may be useful to dimension the length 102 and width 104 of the segment 100 with respect to the expected dimensions of a bale to be wrapped by the CWM 52b. For example, where the baler 10 is expected to produce round bales with a characteristic circumference and width, it may be appropriate to dimension the length 102 and width 104 of the segment 100 with respect to the characteristic circumference and width. (It will be understood that, for other bale or baler configurations, other dimensions may be utilized for the width 104 and the length 102. For a non-cylindrical bale, for example, the length 102 may be dimensioned with respect to the length of an outer perimeter of the non-cylindrical bale, which is to be wrapped with the CWM 52b.)

As depicted, the length 102 extends over approximately three circumferences of the bale 64, and the width 104 extends somewhat longer than the width of the bale 64. In this way, for example, when the bale 64 is wrapped with the CWM 52b, the length 102 of the segment 100 may extend approximately three revolutions around the bale 64. Further, due to the width 104, the segment 100 may extend radially over the side part 62 of the bale 64 (see FIG. 1). It will be understood, however, that other dimensions for the length 102 and the width 104 may be possible, such as a length 102 of two or fewer circumferences of the bale 64 or a width 104 approximately equal to the width of the bale 64.

Also as depicted in FIG. 3A, a second segment 106 of the length of the CWM 52b may be formed from semi-permeable material, similar to the semi-permeable segment 76 described above (see, e.g., FIG. 2A, and related discussion). The semi-permeable segment 106 may be attached to the net wrap segment 100 (directly or indirectly) in various ways and, in various embodiments, may be configured to overlap with the net wrap segment 100 to various degrees.

Generally the semi-permeable segment 106 extends over a length 108 and a width 110, which may relate to the length 102 and width 104 of the net wrap segment 100 in various ways. As depicted, the length 108 of the semi-permeable segment 106 is generally smaller than the length 102 of the net wrap segment 100, and the width 110 of the semi-permeable segment 106 is generally smaller than the width 104 of the net wrap segment 100. For example, whereas the width 104 of the net wrap segment 100 may be larger than the characteristic width of a relevant bale (e.g., the bale 64), the width 110 of the semi-permeable segment 106 may be generally equal to (or less than) the width of the bale. In this way, for example, with the semi-permeable segment 106 centrally located with respect to the width 104 of the net wrap segment 100, the semi-permeable segment 106 may generally cover the entire width of the bale 64, without extending (or extending very far) along the side part 62 of the bale 64.

Whereas the depicted length 102 of the net wrap segment 100 may extend over multiple circumferences (or other outer perimeter lengths) of the bale 64, in certain embodiments, the length 108 of the semi-permeable segment 106 may only extend over one circumference (or less) of the bale 64. As depicted, for example, a distance 112 from a first end of the net wrap segment 100 to a first end of the semi-permeable segment 106 may be approximately equal to one circumference of the bale 64. The length 108 of the semi-permeable segment 106, as well as a length 114 from a second end of the semi-permeable segment 106 to a second end of the net wrap segment 100, may also be approximately equal to one circumference of the bale 64. In this way, as the bale is wrapped by the length of the CWM 52b depicted in FIG. 3A, the full circumference of the bale 64 may be wrapped with the length 112 of the net wrap segment 100. This may generally provide a binding layer, to hold the crop material in place in the formed bale. Another full circumference of the bale 64 may then be wrapped with the length 108 of the semi-permeable segment 106, with the semi-permeable segment 106 overlapping with the length 112 of the net wrap segment 100. Finally, still another full circumference of the bale 64 may be wrapped with the length 114 of the net wrap segment 100, with the length 114 of the net wrap segment 100 overlapping with the length 108 of the semi-permeable segment 106. In this way, a sleeve of the CWM 52b with multiple overlapping layers, including multiple barrier layers, may be formed around the bale 64. Various fasteners (e.g., fasteners 98) may then be utilized to secure the sleeve in place.

Still referring to FIG. 3A, still another segment 116 may be included in the depicted length of the CWM 52b. The segment 116 may exhibit a length 118 and a width 120, and may be generally configured to overlap with the semi-permeable segment 106 as well as the net wrap segment 100. As also described above, this may provide a region on the CWM 52b in which the combined barrier layers of the segment 116 and the semi-permeable segment 106 offer greater resistance to the passage of liquids than the semi-permeable segment 106 alone. This may be useful, for example, in order to provide enhanced protection against rain or standing water over part, but not all, of a wrapped bale. The segment 116 may also (or alternatively) serve other functions, such as to protect at least part of the semi-permeable segment 106 (or the bale 64 and wrapping thereof, generally) from UV rays, or other environmental effects. The segment 116 may be attached (directly or indirectly) to the semi-permeable segment or to the net wrap segment 100 in various ways.

In certain embodiments, the segment 116 may be formed from a semi-permeable material that is the same as (or similar to) the material forming the semi-permeable segment 106. For example, where the semi-permeable segment 106 is formed from micro-perforated plastic film, the perforations in the film may tend to permit the passage of some amount of liquid water, as well as water vapor. With the segment 116 also formed of micro-perforated plastic film, the double (or other multiple) barrier layers of the overlapping segments 106 and 116 may usefully reduce the amount of liquid water that passes from the ambient environment to a wrapped bale, while still permitting some amount of water vapor to escape from the bale.

In certain embodiments, the segment 116 may be formed from a different material. For example, in contrast to the semi-permeable segment 106, the segment 116 may be formed from impermeable material, such as non-perforated plastic sheeting that is impermeable to liquid and vapor. In this way, for example, where the segments 106 and 116 overlap, the resulting double (or other multiple) barrier layers may substantially prevent passage of liquid water into the bale, while still potentially allowing some water vapor to escape (e.g., around the edges of the segment 116). Alternatively (or additionally) various other materials may be utilized for the segment 116.

Although alternative configurations may be possible, in the embodiments depicted, one or both of the length 118 and width 120 of the segment 116 may be somewhat smaller in dimension than the length 108 and width 110 of the semi-permeable segment 106. As depicted in FIG. 3A, for example, the length 118 and width 120 of the segment 116 extend over only a fraction of the length 108 and width 110 of the semi-permeable segment 106. Also as depicted, the segment 116 is centrally disposed on the semi-permeable segment 106 (and the net wrap segment 100) so as to overlap with a central region 106a of the semi-permeable segment 106. As depicted, this results in the non-overlapping portions of the semi-permeable segment 106 (with respect to the segment 116) forming a generally symmetric perimeter around the segment 116. Other configurations may also be possible.

Configuring the length 118 and width 120 of the segment 116 to be somewhat smaller than the length 108 and width 110 of the semi-permeable segment 106 may be useful in order for the multiple barrier layers provided by the overlapping segments 106 and 116 to extend over part, but not all, of the circumference and width of the bale 64. For example, in the embodiment depicted in FIG. 3A, when the bale 64 is wrapped with the CWM 52b, the net wrap segment 100 may wrap around the circumference of the bale 64 three times and the semi-permeable segment 106 may wrap around the circumference of the bale 64 one time. The segment 116, however, may wrap only part way around the circumference of the bale 64 (e.g., one-tenth of the circumference, or more), such that part of the bale 64 is wrapped by the semi-permeable segment 106 but not by the segment 116. Further, the segment 116 may not extend fully across the width of the bale 64. In this way, for example, the portion of the bale 64 where the segments 106 and 116 overlap may exhibit relatively high impermeability with respect to liquids (or relatively high UV protection), whereas the portion of the bale 64 not wrapped by the segment 116 may exhibit relatively high permeability with respect to vapor.

In certain embodiments, the portion of the bale 64 where the segments 106 and 116 overlap may be positioned in order to maximize protection against liquids (or UV rays), while also allowing for appropriate vapor movement. For example, as depicted in the partial view of FIG. 3B, the bale 64 may be oriented in a field with the segment 116 generally near the top of the bale 64, such that the two barrier layers of the segment 116 and the semi-permeable segment 106 may provide enhanced liquid protection at the top of the bale 64.

Still referring to FIG. 3B, it can be seen, in the embodiment depicted, that the CWM 52b, when wrapped around the bale 64, forms a sleeve 122 of four successive layers. An inner binding layer, formed by the length 112 of the net wrap segment 100, is immediately proximate the cylindrical perimeter 64a of the bale 64. A first barrier layer, formed by the semi-permeable segment 106, is disposed outside of the binding layer, with respect to the bale 64. A second barrier layer, formed by the segment 116, is disposed outside of the first barrier layer, with respect to the bale 64. Finally, a second binding layer, formed by the length 114 of the net wrap segment 100, is disposed outside of the second barrier layer, with respect to the bale 64. It will be understood that, depending on the configuration of the various segments 100, 106, and 116, these various layers (or others), may be disposed at various other locations on the bale 64, and may exhibit various other degrees of overlap (or non-overlap).

In other embodiments, other numbers or configurations of barrier layers may be utilized. For example, where either of the segments 106 or 116 is wrapped additional times around the bale 64, an additional barrier layer (or layers) may be formed. Likewise, where a shorter length of the net wrap segment 100 is utilized, the second binding layer may not be formed by the net wrap segment 100, or may be formed only over part of the bale perimeter 64a. Further, the relative order of the layers may vary from that depicted in FIG. 3B. For example, in the embodiment depicted, the semi-permeable segment 106 is disposed between the segment 116 and the inner layer of the net wrap segment 100, such that the first barrier layer is formed by the semi-permeable segment 106 and the second barrier layer is formed by the segment 116. In other embodiments, the segment 116 may be disposed between the semi-permeable segment 106 and the inner layer of the net wrap segment 100, such that the first barrier layer is formed by the segment 116 and the second barrier layer is formed by the semi-permeable segment 106. In certain embodiments, additional barrier layers (e.g., three, four, or more barrier layers) may be formed. For example, three or more barrier layers may be formed from the segments 106 and 116, from other segments (not shown), or from a combination of one or more of the segments 106 and 116 and other segments (not shown).

Referring also to FIG. 4A, various example overlapping segments of a length of still another example CWM 52c is depicted. The CWM 52c of FIG. 4A may be utilized in various ways, and with various baling devices (e.g., the baler 13). In certain embodiments, multiple instances of the length of the CWM 52c depicted in FIG. 4A may be connected end to end (e.g., integrally formed as a continuous, extended length of the CWM 52c) such that a roll of the CWM 52c (e.g., the roll 38 of FIG. 1) may be formed.

As depicted in FIG. 4A, a first segment 130 of the length of the CWM 52c is formed from net wrap material. The segment 130 extends over a length 132 and a width 134, which may be configured to exhibit various dimensions, as appropriate for a particular baling operation. In certain embodiments, it may be useful to dimension the length 132 and width 134 of the segment 130 with respect to the expected dimensions of a bale to be wrapped by the CWM 52c. For example, where the baler 13 is expected to produce round bales with a characteristic circumference and width, it may be appropriate to dimension the length 132 and width 134 of the segment 130 with respect to the characteristic circumference and width. (It will be understood that, for other bale or baler configurations, other dimensions may be utilized for the width 134 and the length 132. For a non-cylindrical bale, for example, the length 132 may be dimensioned with respect to the length of an outer perimeter of the non-cylindrical bale, which is to be wrapped with the CWM 52c.)

As depicted, the length 132 extends over approximately three circumferences of the bale 64, and the width 134 extends somewhat longer than the width of the bale 64. In this way, for example, when the bale 64 is wrapped with the CWM 52c, the length 132 of the segment 130 may extend approximately three revolutions around the bale 64. Further, due to the width 134, the segment 130 may extend radially over the side part 62 of the bale 64 (see FIG. 1). It will be understood, however, that other dimensions for the length 132 and the width 134 may be possible, such as a length 132 of two or fewer circumferences of the bale 64 or a width 134 approximately equal to the width of the bale 64.

Also as depicted in FIG. 4A, a second segment 136 of the length of the CWM 52c may be formed from semi-permeable material, similar to the semi-permeable segment 76 described above (see, e.g., FIG. 2A, and related discussion). The semi-permeable segment 136 may be attached to the net wrap segment 130 (directly or indirectly) in various ways and, in various embodiments, may be configured to overlap with the net wrap segment 130 to various degrees.

Generally the semi-permeable segment 136 extends over a length 138 and a width 140, which may relate to the length 132 and width 134 of the net wrap segment 130 in various ways. As depicted, the length 138 of the semi-permeable segment 136 is generally smaller than the length 132 of the net wrap segment 130, and the width 140 of the semi-permeable segment 136 is generally smaller than the width 134 of the net wrap segment 130. For example, whereas the width 134 of the net wrap segment 130 may be larger than the characteristic width of a relevant bale (e.g., the bale 64), the width 140 of the semi-permeable segment 136 may be generally equal to (or less than) the width of the bale. In this way, for example, with the semi-permeable segment 136 centrally located with respect to the width 134 of the net wrap segment 130, the semi-permeable segment 136 may generally cover the entire width of the bale 64, without extending (or extending very far) along the side part 62 of the bale 64.

Whereas the depicted length 132 of the net wrap segment 130 may extend over multiple circumferences (or other outer perimeter lengths) of the bale 64, in certain embodiments, the length 138 of the semi-permeable segment 136 may only extend over one circumference (or less) of the bale 64. As depicted, for example, a distance 142 from a first end of the net wrap segment 130 to a first end of the semi-permeable segment 136 may be approximately equal to one circumference of the bale 64. The length 138 of the semi-permeable segment 136, as well as a length 144 from a second end of the semi-permeable segment 136 to a second end of the net wrap segment 130, may also be approximately equal to one circumference of the bale 64. In this way, as the bale is wrapped by the length of the CWM 52c depicted in FIG. 4A, the full circumference of the bale 64 may be wrapped with the length 142 of the net wrap segment 130. This may generally provide a binding layer, to hold the crop material in place in the formed bale. Another full circumference of the bale 64 may then be wrapped with the length 138 of the semi-permeable segment 136, with the semi-permeable segment 136 overlapping with the length 142 of the net wrap segment 130. Finally, still another full circumference of the bale 64 may be wrapped with the length 144 of the net wrap segment 130, with the length 144 of the net wrap segment 130 overlapping with the length 138 of the semi-permeable segment 136. In this way, a sleeve of the CWM 52c with multiple overlapping layers, including multiple barrier layers, may be formed around the bale 64. Various fasteners (e.g., fasteners 128) may then be utilized to secure the sleeve in place.

Still referring to FIG. 4A, still another segment 146 may be included in the depicted length of the CWM 52c. The segment 146 may exhibit a length 148 and a width 150, and may be generally configured to overlap with the semi-permeable segment 136 as well as the net wrap segment 130. As also described above, this may provide a region on the CWM 52c in which the combined barrier layers of the segment 146 and the semi-permeable segment 136 offer greater resistance to the passage of liquids than the semi-permeable segment 136 alone. This may be useful, for example, in order to provide enhanced protection against rain or standing water over part, but not all, of a wrapped bale. The segment 146 may also (or alternatively) serve other functions, such as to protect at least part of the semi-permeable segment 136 (or the bale 64 and wrapping thereof, generally) from UV rays, or other environmental effects. The segment 146 may be attached (directly or indirectly) to the semi-permeable segment or to the net wrap segment 130 in various ways.

In certain embodiments, the segment 146 may be formed from a semi-permeable material that is the same as (or similar to) the material forming the semi-permeable segment 136. For example, where the semi-permeable segment 136 is formed from micro-perforated plastic film, the perforations in the film may tend to permit the passage of some amount of liquid water, as well as water vapor. With the segment 146 also formed of micro-perforated plastic film, the double (or other multiple) barrier layers of the overlapping segments 136 and 146 may usefully reduce the amount of liquid water that passes from the ambient environment to a wrapped bale, while still permitting some amount of water vapor to escape from the bale.

In certain embodiments, the segment 146 may be formed from a different material. For example, in contrast to the semi-permeable segment 136, the segment 146 may be formed from impermeable material, such as non-perforated plastic sheeting that is impermeable to liquid and vapor. In this way, for example, where the segments 136 and 146 overlap, the resulting double (or other multiple) barrier layers may substantially prevent passage of liquid water into the bale, while still potentially allowing some water vapor to escape (e.g., around the edges of the segment 146). Alternatively (or additionally) various other materials may be utilized for the segment 146.

Although alternative configurations may be possible, in the embodiments depicted, one or both of the length 148 and width 150 of the segment 146 may be somewhat smaller in dimension than the length 138 and width 140 of the semi-permeable segment 136. As depicted in FIG. 4A, for example, the width 150 of the segment 146 extends over only a fraction of the width 140 of the semi-permeable segment 136, while the length 148 of the segment 146 extends over approximately the same distance as the length 138 of the semi-permeable segment 136. Also as depicted, the segment 146 is centrally disposed on the semi-permeable segment 136 (and the net wrap segment 130) so as to overlap with a central region 136a of the semi-permeable segment 136. As depicted, this results in the non-overlapping portions of the semi-permeable segment 136 (with respect to the segment 146) being similarly sized and generally congruent with each other. Other configurations may also be possible.

Configuring the width 150 of the segment 146 to be somewhat smaller than the width 140 of the semi-permeable segment 136 may be useful in order for the multiple barrier layers provided by the overlapping segments 136 and 146 to extend over part, but not all, of the width of the bale 64. For example, in the embodiment depicted in FIG. 4A, when the bale 64 is wrapped with the CWM 52c, the net wrap segment 130 may wrap around the circumference of the bale 64 three times and the semi-permeable segment 136 may wrap around the circumference of the bale 64 one time. The segment 146 may also wrap around the circumference of the bale 64 one time, but may not extend as far towards the axial ends of the bale 64 as the semi-permeable segment 136. In this way, for example, the portion of the bale 64 where the segments 136 and 146 overlap may exhibit relatively high impermeability with respect to liquids (or relatively high UV protection), whereas the portion of the bale 64 not wrapped by the segment 146 may exhibit relatively high permeability with respect to vapor.

In certain embodiments, the portion of the bale 64 where the segments 136 and 146 overlap may be positioned in order to maximize protection against liquids (or UV rays), while also allowing for appropriate vapor movement. For example, as depicted in the partial view of FIG. 4B, the bale 64 may be oriented in a field with the segment 146 generally near the top of the bale 64, such that the two barrier layers of the segment 146 and the semi-permeable segment 136 may provide enhanced liquid protection at the top of the bale 64.

Still referring to FIG. 4B, it can be seen, in the embodiment depicted, that the CWM 52c, when wrapped around the bale 64, forms a sleeve 152 of four successive layers. An inner binding layer, formed by the length 142 of the net wrap segment 130, is immediately proximate the cylindrical perimeter 64a of the bale 64. A first barrier layer, formed by the segment 146, is disposed outside of the binding layer, with respect to the bale 64. A second barrier layer, formed by the semi-permeable segment 136, is disposed outside of the first barrier layer, with respect to the bale 64. Finally, a second binding layer, formed by the length 144 of the net wrap segment 130, is disposed outside of the second barrier layer, with respect to the bale 64. It will be understood that, depending on the configuration of the various segments 130, 136, and 146, these various layers (or others), may be disposed at various other locations on the bale 64, and may exhibit various other degrees of overlap (or non-overlap).

In other embodiments, other numbers or configurations of layers, including barrier layers, may be utilized. For example, where either of the segments 136 or 146 is wrapped additional times around the bale 64, an additional barrier layer (or layers) may be formed. Likewise, where a shorter length of the net wrap segment 130 is utilized, a second binding layer may not be formed by the net wrap segment 130, or may be formed only over part of the bale perimeter 64a. Further, the relative order of the layers may vary from that depicted in FIG. 4B. For example, in the embodiment depicted, the segment 146 is disposed between the semi-permeable segment 136 and the inner layer of the net wrap segment 130, such that the first barrier layer is formed by the segment 146 and the second barrier layer is formed by the semi-permeable segment 136. In other embodiments, the semi-permeable segment 136 may be disposed between the segment 146 and the inner layer of the net wrap segment 130, such that the first barrier layer is formed by the semi-permeable segment 136 and the second barrier layer is formed by the segment 146. In certain embodiments, additional barrier layers (e.g., three, four, or more barrier layers) may be formed. For example, three or more barrier layers may be formed from the segments 136 and 146, from other segments (not shown), or from a combination of one or more of the segments 136 and 146 and other segments (not shown).

In the embodiments depicted in FIGS. 2A through 4B, the various semi-permeable segments 76, 106 and 136, and the segments 86, 116, and 146, are generally disposed centrally on the net wrap segments 70, 100, and 130, with respect to the lengths 72, 102, and 132 of the net wrap segments 70, 100, and 130. In other embodiments, one or both of the relevant semi-permeable segment 76, 106, or 136 and the relevant segment 86, 116, and 146 may be disposed elsewhere on the associated net wrap segment 70, 100, or 130. For example, with respect to the CWM 52*a* of FIG. 2A, one or both of the semi-permeable segment 72 and the segment 86 may be disposed closer to the right- or left-side ends of the length 72.

Referring also to FIG. 5A, various example overlapping segments of a length of yet another example CWM 52*d* is depicted. The CWM 52*d* of FIG. 5A may be utilized in various ways, and with various baling devices (e.g., the baler 10). In certain embodiments, multiple instances of the length of the CWM 52*d* depicted in FIG. 5A may be connected end to end (e.g., integrally formed as a continuous, extended length of the CWM 52*d*) such that a roll of the CWM 52*d* (e.g., the roll 38 of FIG. 1) may be formed.

As depicted in FIG. 5A, a first segment 160 of the length of the CWM 52*d* is formed from net wrap material. The segment 160 extends over a length 162 and a width 164, which may be configured to exhibit various dimensions, as appropriate for a particular baling operation. In certain embodiments, it may be useful to dimension the length 162 and width 164 of the segment 160 with respect to the expected dimensions of a bale to be wrapped by the CWM 52*d*. For example, where the baler 10 is expected to produce round bales with a characteristic circumference and width, it may be appropriate to dimension the length 162 and width 164 of the segment 160 with respect to the characteristic circumference and width. (It will be understood that, for other bale or baler configurations, other dimensions may be utilized for the width 164 and the length 162. For a non-cylindrical bale, for example, the length 162 may be dimensioned with respect to the length of an outer perimeter of the non-cylindrical bale, which is to be wrapped with the CWM 52*d*.)

As depicted, the length 162 extends over approximately three circumferences of the bale 64, and the width 164 extends somewhat longer than the width of the bale 64. In this way, for example, when the bale 64 is wrapped with the CWM 52*d*, the length 162 of the segment 160 may extend approximately three revolutions around the bale 64. Further, due to the width 164, the segment 160 may extend radially over the side part 62 of the bale 64 (see FIG. 1). It will be understood, however, that other dimensions for the length 162 and the width 164 may be possible, such as a length 162 of two or fewer circumferences of the bale 64 or a width 164 approximately equal to the width of the bale 64.

Also as depicted in FIG. 5A, a second segment 166 of the length of the CWM 52*d* may be formed from semi-permeable material, similar to the semi-permeable segment 76 described above (see, e.g., FIG. 2A, and related discussion). The semi-permeable segment 166 may be attached to the net wrap segment 160 (directly or indirectly) in various ways and, in various embodiments, may be configured to overlap with the net wrap segment 160 to various degrees.

Generally the semi-permeable segment 166 extends over a length 168 and a width 170, which may relate to the length 162 and width 164 of the net wrap segment 160 in various ways. As depicted, the length 168 of the semi-permeable segment 166 is generally smaller than the length 162 of the net wrap segment 160, and the width 170 of the semi-permeable segment 166 is generally smaller than the width 164 of the net wrap segment 160. For example, whereas the width 164 of the net wrap segment 160 may be larger than the characteristic width of a relevant bale (e.g., the bale 64), the width 170 of the semi-permeable segment 166 may be generally equal to (or less than) the width of the bale. In this way, for example, with the semi-permeable segment 166 centrally located with respect to the width 164 of the net wrap segment 160, the semi-permeable segment 166 may generally cover the entire width of the bale 64, without extending (or extending very far) along the side part 62 of the bale 64.

Whereas the depicted length 162 of the net wrap segment 160 may extend over multiple circumferences (or other outer perimeter lengths) of the bale 64, in certain embodiments, the length 168 of the semi-permeable segment 166 may only extend over one circumference (or less) of the bale 64. As depicted, for example, a distance 172 from a first end of the net wrap segment 160 to a first end of the semi-permeable segment 166 may be approximately equal to one circumference of the bale 64. The length 168 of the semi-permeable segment 166, as well as a length 174 from a second end of the semi-permeable segment 166 to a second end of the net wrap segment 160, may also be approximately equal to one circumference of the bale 64. In this way, as the bale is wrapped by the length of the CWM 52*d* depicted in FIG. 5A, the full circumference of the bale 64 may be wrapped with the length 172 of the net wrap segment 160. This may generally provide a binding layer, to hold the crop material in place in the formed bale. Another full circumference of the bale 64 may then be wrapped with the length 168 of the semi-permeable segment 166, with the semi-permeable segment 166 overlapping with the length 172 of the net wrap segment 160. Finally, still another full circumference of the bale 64 may be wrapped with the length 174 of the net wrap segment 160, with the length 174 of the net wrap segment 160 overlapping with the length 168 of the semi-permeable segment 166. In this way, a sleeve of the CWM 52*d* with multiple overlapping layers, including multiple barrier layers, may be formed around the bale 64. Various fasteners (e.g., fasteners 158) may then be utilized to secure the sleeve in place.

Still referring to FIG. 5A, still another segment 176 may be included in the depicted length of the CWM 52*d*. The segment 176 may exhibit a length 178 and a width 180, and may be generally configured to overlap with the semi-permeable segment 166 as well as the net wrap segment 160. As also described above, this may provide a region on the CWM 52*d* in which the combined barrier layers of the segment 176 and the semi-permeable segment 166 offer greater resistance to the passage of liquids than the semi-permeable segment 166 alone. This may be useful, for example, in order to provide enhanced protection against rain or standing water over part, but not all, of a wrapped bale. The segment 176 may also (or alternatively) serve other functions, such as to protect at least part of the semi-permeable segment 166 (or the bale 64 and wrapping thereof, generally) from UV rays, or other environmental effects. The segment 176 may be attached (directly or indirectly) to the semi-permeable segment or to the net wrap segment 160 in various ways.

In certain embodiments, the segment 176 may be formed from a semi-permeable material that is the same as (or similar to) the material forming the semi-permeable segment 166. For example, where the semi-permeable segment 166 is formed from micro-perforated plastic film, the perforations in the film may tend to permit the passage of some amount of liquid water, as well as water vapor. With the segment 176 also formed of micro-perforated plastic film, the double (or other multiple) barrier layers of the overlapping segments 166 and 176 may usefully reduce the amount of liquid water that passes from the ambient environment to a wrapped bale, while still permitting some amount of water vapor to escape from the bale.

In certain embodiments, the segment 176 may be formed from a different material. For example, in contrast to the semi-permeable segment 166, the segment 176 may be formed from impermeable material, such as non-perforated plastic sheeting that is impermeable to liquid and vapor. In this way, for example, where the segments 166 and 176 overlap, the resulting double (or other multiple) barrier layers may substantially prevent passage of liquid water into the bale, while still potentially allowing some water vapor to escape (e.g., around the edges of the segment 176). Alternatively (or additionally) various other materials may be utilized for the segment 176.

Although alternative configurations may be possible, in the embodiments depicted, one or both of the length 178 and width 180 of the segment 176 may be somewhat smaller in dimension than the length 168 and width 170 of the semi-permeable segment 166. As depicted in FIG. 5A, for example, the width 180 of the segment 176 extends over only a fraction of the width 170 of the semi-permeable segment 166, while the length 178 of the segment 176 extends a comparable (but offset) distance as the length 168 of the semi-permeable segment 166. It will be understood that other configurations are possible.

In certain embodiments, various segments of the disclosed CWM may overlap only in part. For example, as depicted in FIG. 5A, the segment 176 partly overlaps with the semi-permeable segment 166 and partly does not overlap with the semi-permeable segment 166. The orientation and extent of such a partially overlapping configuration may be varied, as appropriate. As depicted, for example, a trailing edge 184 of the segment 176 extends beyond a trailing edge 186 of the semi-permeable segment 166, such that a part 192 of the segment 176 overlaps with the semi-permeable segment 166 and a part 194 of the segment 176 does not overlap with the semi-permeable segment 166. It will be understood, however, that other configurations are possible. For example, a leading edge 188 of the segment 176 may alternatively (or additionally) be configured to extend beyond a leading edge 190 of the semi-permeable segment 166, such that different parts (not shown) of the segment 176 overlap (and do not overlap) with the semi-permeable segment 166. Likewise, other edges (e.g., side edges) of the segment 176 may extend beyond edges (e.g., side edges) of the semi-permeable segment 166, such that other parts (not shown) of the segment 176 overlap (and do not overlap) with the semi-permeable segment 166.

In certain embodiments, the portion of the bale 64 where the segments 166 and 176 overlap may be positioned in order to maximize protection against liquids (or UV rays), while also allowing for appropriate vapor movement. For example, as depicted in the partial view of FIG. 5B, the bale 64 may be oriented in a field with the segment 176 generally near the top of the bale 64, such that the two barrier layers of the segment 176 and the semi-permeable segment 166 may provide enhanced liquid protection at the top of the bale 64.

Still referring to FIG. 5B, it can be seen, in the embodiment depicted, that the CWM 52d, when wrapped around the bale 64, forms a sleeve 182 of four successive layers. An inner binding layer, formed by the length 172 of the net wrap segment 160, is immediately proximate the cylindrical perimeter 64a of the bale 64. A first barrier layer, formed by the semi-permeable segment 166, is disposed outside of the binding layer, with respect to the bale 64. A second barrier layer, formed by the segment 176, is disposed outside of the first barrier layer, with respect to the bale 64. Finally, a second binding layer, formed by the length 174 of the net wrap segment 160, is disposed outside of the second barrier layer, with respect to the bale 64. As also discussed above, it can be seen in FIG. 5B that a part 194 of the second barrier layer (i.e., as formed by the segment 176) does not overlap with the first barrier layer (i.e., as formed by the semi-permeable segment 166). It will be understood that, depending on the configuration of the various segments 160, 166, and 176, these various layers (or others), may be disposed at various other locations on the bale 64, and may exhibit various other degrees of overlap (or non-overlap).

In other embodiments, other numbers or configurations of layers, including barrier layers, may be utilized. For example, where either of the segments 166 or 176 is wrapped additional times around the bale 64, an additional barrier layer (or layers) may be formed. Likewise, where a shorter length of the net wrap segment 160 is utilized, a second binding layer may not be formed by the net wrap segment 160, or may be formed only over part of the bale perimeter 64a. Further, the relative order of the layers may vary from that depicted in FIG. 5B. For example, in the embodiment depicted, the semi-permeable segment 166 is disposed between the segment 176 and the inner layer of the net wrap segment 160, such that the first barrier layer is formed by the semi-permeable segment 166 and the second barrier layer is formed by the segment 176. In other embodiments, the segment 176 may be disposed between the semi-permeable segment 166 and the inner layer of the net wrap segment 160, such that the first barrier layer is formed by the segment 176 and the second barrier layer is formed by the semi-permeable segment 166. In certain embodiments, additional barrier layers (e.g., three, four, or more barrier layers) may be formed. For example, three or more barrier layers may be formed from the segments 166 and 176, from other segments (not shown), or from a combination of one or more of the segments 166 and 176 and other segments (not shown).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the any use of terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A composite wrap material for wrapping an outer perimeter of a bale of agricultural material having a width and a circumference defining an outer perimeter length of the bale, the composite wrap material comprising:
a segment of net wrap with a length that is longer than the outer perimeter length of the bale and a width that is at least as wide as the width of the bale;
a first barrier segment of semi-permeable material configured to be permeable to water vapor, the first barrier segment being disposed to overlap the segment of net wrap, the first barrier segment has a length that is at least as long as the outer perimeter length of the bale and a width that is at least as wide as the width of the bale; and
a second barrier segment of either semi-permeable or impermeable material disposed to overlap the first barrier segment and the segment of net wrap, the second barrier segment being distinct from the first barrier segment and a different size relative to the first barrier segment, wherein the second barrier segment has a length and a width at least one of which is less than the length and/or width of the first barrier segment, wherein the length of the second barrier segment being at least one-tenth of the outer perimeter length of the bale, and wherein the length and width of the second barrier segment are defined between terminal edges of the second barrier segment, at least one of the terminal edges being backed by the first barrier segment;
wherein, before the bale is wrapped by the composite wrap material, the composite wrap material includes a pre-wrap region of overlap of only the segment of net wrap and the first barrier segment and the composite wrap material includes a pre-wrap region of overlap of the segment of net wrap, the first barrier segment and the second barrier segment;
wherein, when the bale is wrapped by the composite wrap material, the pre-wrap region of overlap of the segment of net wrap, the first barrier segment and the second barrier segment impedes movement of liquid water from outside the composite wrap material to the outer perimeter of the bale and the pre-wrap region of overlap of only the segment of net wrap and the first barrier segment permits passage of water vapor from the bale;
wherein, when the composite wrap material is wrapped around the bale, the composite wrap material forms a sleeve of successive layers, which, along an upper region of the bale, include, in a direction from the outer perimeter of the bale to outside of the sleeve, at least parts of:
the segment of net wrap,
the first barrier segment, and
the second barrier segment; and
wherein the pre-wrap region of overlap directs liquid water from outside the composite wrap material at the upper region of the bale from the second barrier segment over the at least one terminal edge of the second barrier segment onto the first barrier segment.

2. The composite wrap material of claim 1, wherein the second barrier segment is impermeable to liquid water.

3. The composite wrap material of claim 1, wherein the second barrier segment is impermeable to water vapor.

4. The composite wrap material of claim 1, wherein the length of the segment of net wrap is at least twice the outer perimeter length of the bale.

5. The composite wrap material of claim 1, wherein a leading edge or a trailing edge of the second barrier segment extends, respectively, beyond a leading edge or a trailing edge of the first barrier segment, such that at least a part of the second barrier segment does not overlap the first barrier segment.

6. The composite wrap material of claim 1, wherein the length of the second barrier segment is less than the length of the first barrier segment.

7. The composite wrap material of claim 1, wherein the second barrier segment overlaps only a central region of the first barrier segment.

8. The composite wrap material of claim 7, wherein a width of the second barrier segment is smaller than a width of the first barrier segment.

9. The composite wrap material of claim 7, wherein the length of the second barrier segment is less than the length of the first barrier segment.

10. A roll of composite wrap material for successively and individually wrapping bales of agricultural material, each having a width and a circumference defining an outer perimeter of each of the bales having an outer perimeter length, the roll of composite wrap material comprising:
a length of net wrap configured as a plurality of segments of net wrap, each of the plurality of segments being configured with a length that is longer than the outer perimeter length of the bales and a width that is at least as wide as the width of the bales, the segments being arranged end to end, with respect to the lengths of the segments, along the length of net wrap;
a plurality of first barrier segments of semi-permeable material configured to be permeable to water vapor, each first barrier segment being disposed to overlap a corresponding one of the segments of net wrap, each of the first barrier segments has a length that is at least as long as the outer perimeter length of the bales and has a width that is at least as wide as the width of the bales; and
a plurality of second barrier segments of either semi-permeable or impermeable material, each of the second barrier segments being disposed to overlap a corresponding one of the first barrier segments and the segment of net wrap associated with the corresponding first barrier segment, each second barrier segment being distinct from each first barrier segment and of a different size relative to a corresponding one of the first barrier segments, wherein each of the second barrier segments has a length and a width at least one of which is less than the length and/or width of each first barrier segment, wherein the length of each of the second barrier segments being at least one-tenth of the outer perimeter length of the bales, and wherein the length and width of each of the second barrier segments are defined between terminal edges of each of the second barrier segments, at least one of the terminal edges of each of the second barrier segments being backed by a corresponding one of the first barrier segments;

wherein, before the bale is wrapped by the composite wrap material, the composite wrap material includes pre-wrap regions of overlap of associated ones of only the segments of net wrap and the first barrier segments and pre-wrap regions of overlap of associated ones of the segments of net wrap, the first barrier segments, and the second barrier segments;

wherein, as the bales are wrapped with the roll of composite wrap material, the pre-wrap regions of overlap of the segments of net wrap, the first barrier segments and the second barrier segments impede movement of liquid water from outside the composite wrap material to the outer perimeters of the bales and the pre-wrap regions of overlap of only the segments of net wrap and the first barrier segments permit passage of water vapor from the bales;

wherein, when the bales are wrapped with the roll of composite wrap material, the composite wrap material forms sleeves each of successive layers, which, along an upper region of each of the bales, include for each sleeve, in a direction from the outer perimeter of the bale to outside of the sleeve, at least parts of:

a corresponding one of the segments of net wrap, a corresponding one of the first barrier segments, and a corresponding one of the second barrier segments; and wherein each of the pre-wrap regions of overlap directs liquid water from outside the composite wrap material at the upper region of the corresponding one of the bales from the corresponding one of the second barrier segments over the at least one terminal edge of the corresponding one of the second barrier segments onto the corresponding one of the first barrier segments.

11. The roll of composite wrap material of claim 10, wherein the length of each of the segments of net wrap is greater than the outer perimeter length of the bales.

12. The roll of composite wrap material of claim 10, wherein a length of each of the second barrier segments is less than the outer perimeter length of the bales.

13. The roll of composite wrap material of claim 10, wherein each of the second barrier segments overlaps only a central region of the corresponding one of the first barrier segments.

14. The roll of composite wrap material of claim 13, wherein the width of each of the second barrier segments is less than the width of the corresponding one of the first barrier segments.

15. The roll of composite wrap material of claim 13, wherein the length of each of the second barrier segments is less than the length of the corresponding one of the first barrier segments.

16. A composite wrap material for wrapping a circumference of a cylindrical bale of agricultural material, the circumference of the bale having a bale perimeter length, the composite wrap material comprising:

a segment of net wrap with a length that is at least twice as long as the bale perimeter length and a width that is at least as wide as the bale;

a first barrier segment of semi-permeable material configured to be permeable to water vapor, the first barrier segment being disposed to overlap the segment of net wrap and having a length that is at least as long as the bale perimeter length; and a second barrier segment of either semi-permeable or impermeable material disposed to overlap the first barrier segment and the segment of net wrap, the second barrier segment being distinct from the first barrier segment and of a lesser size relative to the first barrier segment;

wherein, before the bale is wrapped by the composite wrap material, the composite wrap material includes a first pre-wrap region of overlap of only the segment of net wrap and the first barrier segment and the composite wrap material includes a second pre-wrap region of overlap of the segment of net wrap, the first barrier segment and the second barrier segment;

wherein, when the bale is wrapped by the composite wrap material, the composite wrap material forms a sleeve of successive layers, moving from the bale to outside of the sleeve, having, over an upper region of the bale, a binding layer of the segment of net wrap, a first barrier layer of the first barrier segment, and a second barrier layer of the second barrier segment, and having, over a lower region of the bale, the binding layer of the segment of net wrap and the first barrier layer of the first barrier segment without the second barrier layer of the second barrier segment; and wherein, the composite wrap material is configured so that the second barrier layer of the second barrier segment impedes penetration of ultraviolet radiation into the first barrier layer of the first barrier segment at the second pre-wrap region of overlap while permitting passage of water vapor from the bale at the first pre-wrap region of overlap.

* * * * *